United States Patent
Drapala et al.

(10) Patent No.: US 9,734,110 B2
(45) Date of Patent: Aug. 15, 2017

(54) DYNAMIC SYNCHRONOUS TO ASYNCHRONOUS FREQUENCY TRANSITIONS IN HIGH-PERFORMANCE SYMMETRIC MULTIPROCESSING

(71) Applicant: International Business Machines Corporation, Armonk, NY (US)

(72) Inventors: Garrett M. Drapala, Cary, NC (US); Michael F. Fee, Cold Springs, NY (US); Kenneth D. Klapproth, Austin, TX (US); Robert J. Sonnelitter, III, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 247 days.

(21) Appl. No.: 14/621,467

(22) Filed: Feb. 13, 2015

(65) Prior Publication Data

US 2016/0239450 A1    Aug. 18, 2016

(51) Int. Cl.
H05K 7/10 (2006.01)
G06F 13/40 (2006.01)
G06F 13/42 (2006.01)

(52) U.S. Cl.
CPC ...... G06F 13/4068 (2013.01); G06F 13/4221 (2013.01)

(58) Field of Classification Search
CPC .................. G06F 13/4221; G06F 13/4068
(Continued)

(56) References Cited

U.S. PATENT DOCUMENTS 5,890,003 A * 3/1999 Cutts, Jr. ............... G06F 9/52
710/263
7,174,468 B2  2/2007 Gary et al.
(Continued)

FOREIGN PATENT DOCUMENTS

CN    202998002 U    6/2013
WO    03060738 A1    7/2003

OTHER PUBLICATIONS

Deanna Postles Dunn Berger et al., pending U.S. Appl. No. 14/621,454 entitled "Position-Based Replacement Policy for Address Synonym Management in Shared Caches," filed Feb. 13, 2015.
(Continued)

Primary Examiner — Chun-Kuan Lee
(74) Attorney, Agent, or Firm — Cantor Colburn LLP; Margaret A. McNamara (57) ABSTRACT

In one embodiment, a computer-implemented method includes instructing two or more processors that are operating in a normal state of a symmetric multiprocessing (SMP) network to transition from the normal state to a slow state. The two or more processors reduce their frequencies to respective target frequencies in a transitional state when transitioning from the normal state to the slow state. It is determined that the two or more processors have achieved their respective target frequencies for the slow state. The slow state is entered, responsive to this determination. Responsive to entering the slow state, a first processor of the two or more processors is instructed to send empty packets across an interconnect to compensate for a first greatest potential rate differential between the first processor and a remainder of the two or more processors during the slow state.

15 Claims, 4 Drawing Sheets

(58) Field of Classification Search
USPC .......................................................... 710/301
See application file for complete search history.

(56) References Cited

U.S. PATENT DOCUMENTS

| | | | |
|---|---|---|---|
| 7,219,241 | B2 | 5/2007 | Cooper et al. |
| 8,250,395 | B2 | 8/2012 | Carter et al. |
| 8,732,495 | B2 | 5/2014 | Hsiao et al. |
| 2007/0177567 | A1* | 8/2007 | Parys .................... H04W 74/04 370/346 |
| 2013/0179704 | A1 | 7/2013 | Ananthakrishnan et al. |
| 2014/0068284 | A1 | 3/2014 | Bhandaru et al. |
| 2014/0089690 | A1* | 3/2014 | Fukuda ..................... G06F 1/26 713/300 |
| 2014/0136737 | A1 | 5/2014 | Dreps et al. |

OTHER PUBLICATIONS

Disclosed anonymously(Dec. 2012). Clocking scheme for 3-d chip structures to minimize chip-to-chip clock skew in a synchronous clock environment. IPCOM000223875D 8 pgs.

Garrett M. Drapala et al., pending U.S. Appl. No. 14/621,460 entitled "Early Shared Resource Release in Symmetric Multiprocessing Computer Systems," filed Feb. 13, 2015.

List of IBM Patents or Patent Applications Treated as Related, 2 pgs.

* cited by examiner

DYNAMIC SYNCHRONOUS TO ASYNCHRONOUS FREQUENCY TRANSITIONS IN HIGH-PERFORMANCE SYMMETRIC MULTIPROCESSING

BACKGROUND

Various embodiments of this disclosure relate to high-performance symmetric multiprocessing (SMP) and, more particularly, to dynamic synchronous to asynchronous frequency transitions in high-performance symmetric multiprocessing.

When an n-way SMP network is used in a computer system, the processor cores of the computer system are typically distributed across many processors, which are connected together using high-performance buses that run synchronously with the processor cores. Together, these high-performance buses and any other components connecting the processors together make up an interconnect between the processors. Synchronicity across the processor cores minimizes delay in moving data across the interconnect between processors in the SMP network. To save power at the system level, it is desirable to have the ability to slow the frequency of some processor cores during periods of low system activity, but doing so can result in asynchronous operation.

Traditionally, slowing down a processor core requires the SMP network as a whole to slow down as well, to maintain the synchronicity between the processor core in question and the interconnect. The interconnect will generally have operating parameters, requiring it to run at a certain frequency or range of frequencies. Thus, the entire SMP network cannot be slowed to save power, and a processor core may be required to run at a different frequency than the interconnect to achieve power savings. Thus, it is sometimes necessary to independently scale the rates of processors and interconnect buses when entering a power-save mode. Some techniques exist for dynamically switching between synchronous and asynchronous operation, but these techniques lack the desired level of performance.

SUMMARY

In one embodiment of this disclosure, a computer-implemented method includes instructing two or more processors that are operating in a normal state of a symmetric multiprocessing (SMP) network to transition from the normal state to a slow state. The two or more processors reduce their frequencies to respective target frequencies in a transitional state when transitioning from the normal state to the slow state. It is determined that the two or more processors have achieved their respective target frequencies for the slow state. The slow state is entered, responsive to this determination. Responsive to entering the slow state, a first processor of the two or more processors is instructed to send empty packets across an interconnect to compensate for a first greatest potential rate differential between the first processor and a remainder of the two or more processors during the slow state.

In another embodiment, a system includes a memory having computer readable instructions and one or more processing devices for executing the computer readable instructions. The computer readable instructions include instructing two or more processors that are operating in a normal state of an SMP network to transition from the normal state to a slow state. The two or more processors reduce their frequencies to respective target frequencies in a transitional state when transitioning from the normal state to the slow state. According to the computer readable instructions, it is determined that the two or more processors have achieved their respective target frequencies for the slow state. According to the computer readable instructions, a slow state is entered, responsive to this determination. Further according to the computer readable instructions, and responsive to entering the slow state, a first processor is instructed to send empty packets across an interconnect to compensate for a first greatest potential rate differential between the first processor and a remainder of the two or more processors during the slow state.

In yet another embodiment, a computer program product for transitioning between a synchronous mode of operation and an asynchronous mode of operation includes a computer readable storage medium having program instructions embodied therewith. The program instructions are executable by a processing device to cause the processing device to perform a method. The method includes instructing two or more processors that are operating in a normal state of a symmetric multiprocessing (SMP) network to transition from the normal state to a slow state. The two or more processors reduce their frequencies to respective target frequencies in a transitional state when transitioning from the normal state to the slow state. Further according to the method, it is determined that the two or more processors have achieved their respective target frequencies for the slow state. The slow state is entered, responsive to this determination. Responsive to entering the slow state, a first processor of the two or more processors is instructed to send empty packets across an interconnect to compensate for a first greatest potential rate differential between the first processor and a remainder of the two or more processors during the slow state.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Various embodiments of this disclosure are transition systems and methods that compensate for dynamic adjustments in frequency between processor cores and an interconnect. Specifically, some embodiments of the transition system may compensate for frequency differentials in transitions between synchronous and asynchronous frequencies. As a result, the frequency of a processor core may be dynamically adjusted when a system interconnect requires a fixed frequency, such as for the purpose of power saving.

Figure 1:
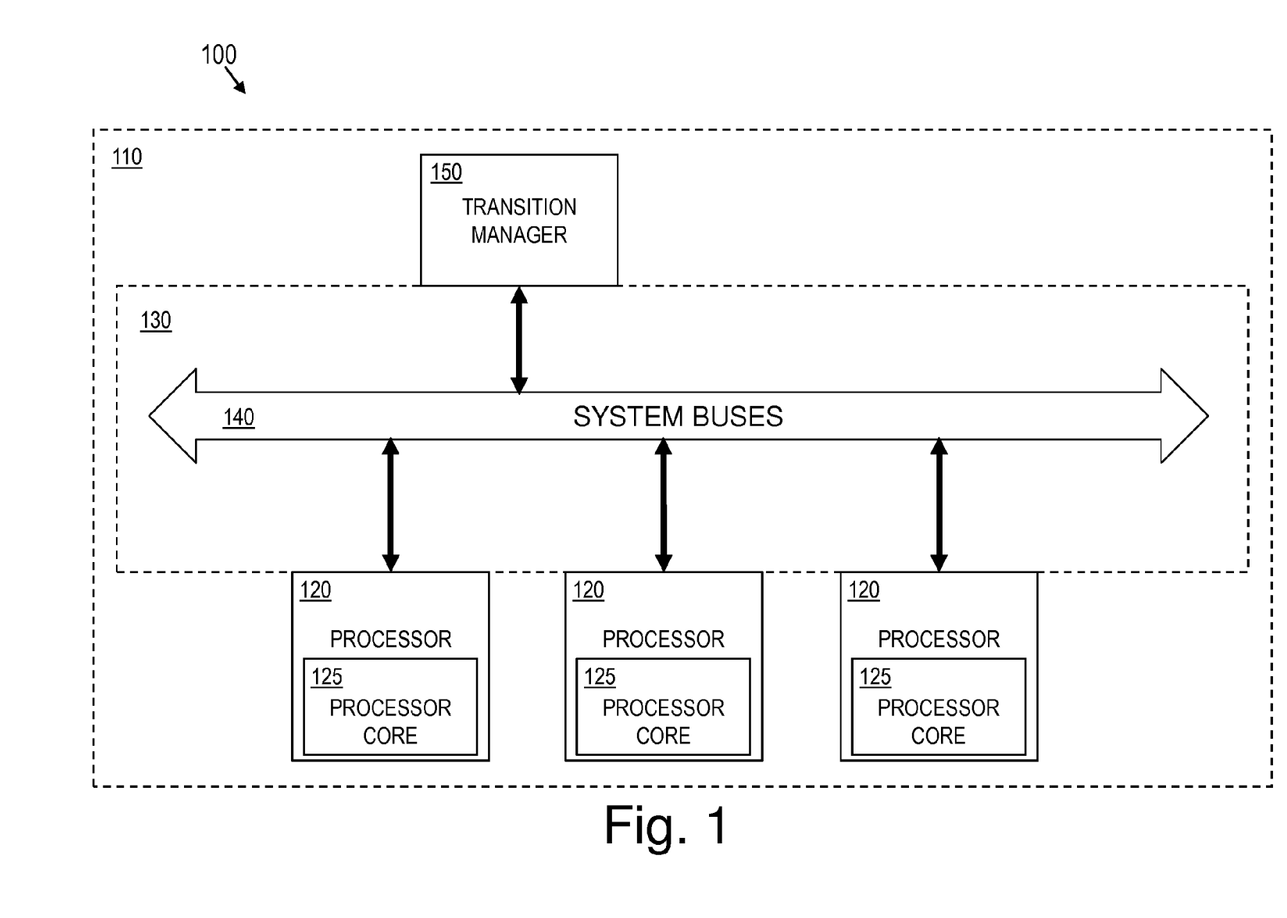
FIG. 1 is a block diagram of a transition system in an SMP network, according to some embodiments of this disclosure.
Figure 4:
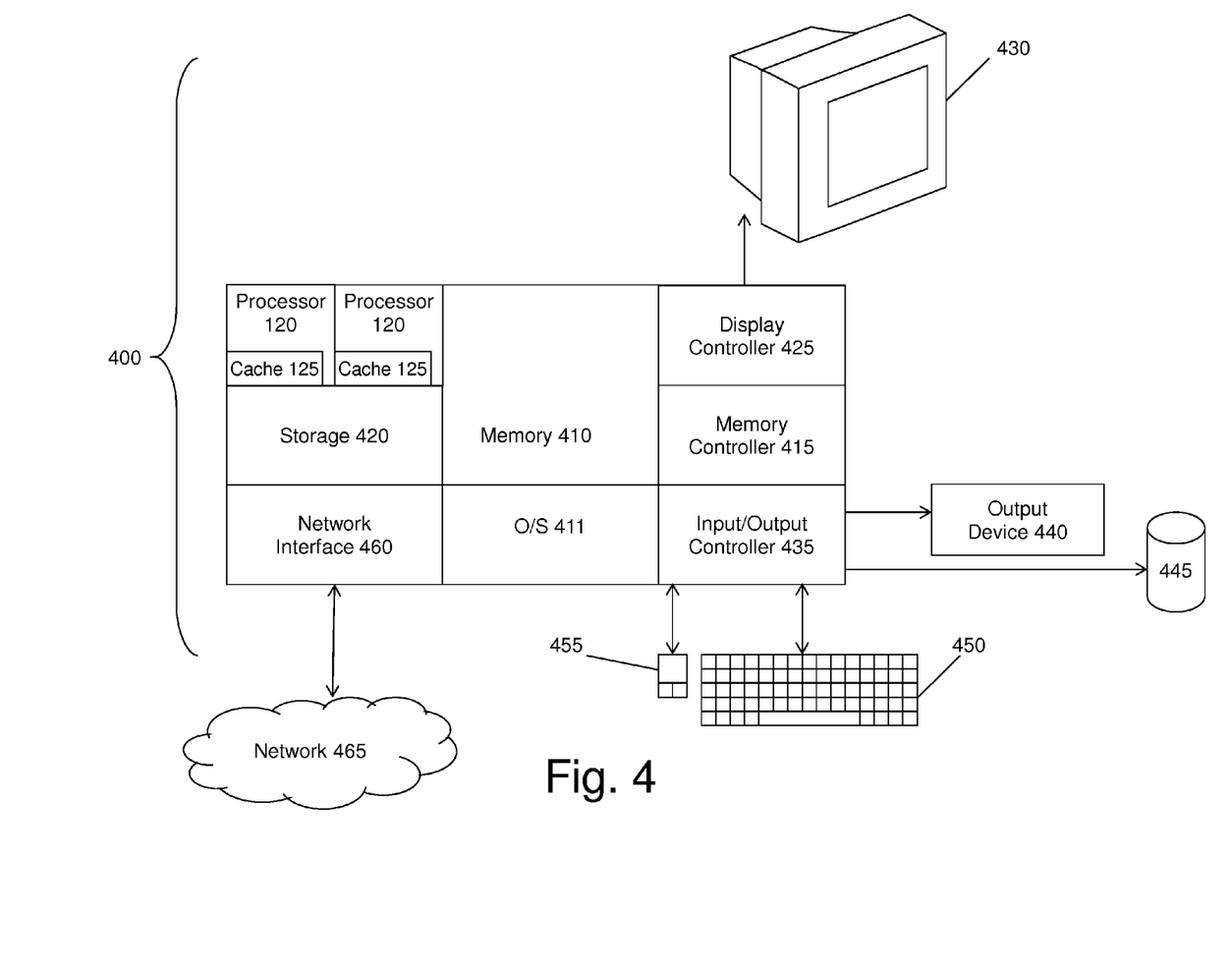
FIG. 4 is a block diagram of a computing device for implementing some or all aspects of the transition system, according to some embodiments of this disclosure.

FIG. 1 is a block diagram of a transition system 100 for a symmetric multiprocessing (SMP) network, according to some embodiments of this disclosure. As shown, the SMP network 110 may include two or more processors 120, each with its own cache 122 and at least one processor core 125. An interconnect 130, which may include one or more system buses 140, may provide a communication link between the various processors 120. The transition system 100 may include a transition manager 150, which may manage the SMP network's switches between synchronous and asynchronous modes, and may be in communication with the various processors 120. The transition manager 150 may be made up of hardware, software, or a combination of both. In some embodiments, the SMP network 110 and transition system 100 may operate, at least in part, within a computer system 400 (FIG. 4).

During a normal state of system operation, the processor cores 125 and system buses 140 run in synchronous mode, with all processor cores 125 and buses 140 operating at the same frequency. The computer system 400 may enter a slow state, or power-save mode, by slowing the frequency of its processors 120, while leaving the system buses 140 at their present frequency. Thus, the slow state is an asynchronous mode of operation for the processor cores 125 and the interconnect 130, in which one or more of the processors 120 are operating at a lower frequency than the system buses 140.

To initiate the slow state, such as for the purpose of saving power, the transition manager 150 may notify the processors 120 of the impending state change from normal state to slow state. To this end, the transition manager 150 may broadcast this notification across the interconnect 130. In some embodiments, the notification may interpreted as an instruction to transition to the slow state, and to send empty packets during the transition as discussed below.

Upon receiving notification of the impending asynchronous mode, each processor 120 may enter a transitional state, or transition mode. In the transitional state, each processor 120 may send one or more empty packets, or NULL packets, across the interconnect 130. An empty packet may take various forms, but may generally be a packet that contains no substantive message and is sent for the sake of timing. Each empty packet may be dropped by its recipient without being acted upon. In some embodiments, it need not matter which processor 120 or other component is selected as a recipient of an empty packet, because the empty packets are not intended for use by the recipients. These empty packets may be used to account for frequency differences between two processors 120 that are connected together over the interconnect 130.

For example, if Processor A is 20% slower than Processor B, then Processor A may achieve four cycles in the time it takes for Processor B to achieve five cycles. Thus, when communicating across the interconnect 130, Processor B may send empty packets 20% of the time to avoid overrunning the slower Processor A.

While in the transitional state, the processor clocks on the processors 120 may slow down. Different processors 120 may have different deceleration rates and may end up at different target frequencies after the slow-down is complete. Thus, to ensure that no processor 120 overruns any other, each processor 120 may send enough empty packets to cover the greatest potential difference in frequency, or greatest potential rate differential, between itself and the other processors 120. Further, in some embodiments, each processor 120 may begin sending empty packets during the transitional state before the processors 120 begin to reduce their speed.

In some embodiments, the transition manager 150 may calculate this greatest potential rate differential for each processor 120, or each processor may calculate this value for itself. For each processor 120, the greatest potential rate differential may be calculated as that processor's initial frequency during the normal state minus the lowest target frequency of all the processors 120. In some embodiments, the target frequency for each processor 120 when transitioning to a slow state may be fixed and based on operating parameters of that processor 120, and the transition manager 150 may be aware of the target frequency for each processor 120. Thus, the transition manager 150 may be capable of performing the calculation of greatest potential rate differential for each processor 120. If this calculation is performed by the transition manager 150, the transition manager 150 may notify each processor 120 of the greatest potential rate differential applicable to that processor 120.

Each processor 120 may occasionally send empty packets during the transitional state, where the frequency by which empty packets are sent may be based on the greatest potential rate differential for that processor 120. More specifically, if the greatest potential rate differential for a first processor 120 is X percent (i.e., another processor 120 may be as much as X percent slower than the first processor 120), then the first processor 120 may send empty packets X percent of the time. Thus, in some embodiments, the percentage of empty packets sent may be equal to the greatest potential rate differential.

When each processor 120 reaches its target frequency, that processor 120 may notify the transition manager 150 that the target frequency has been achieved. Thus, the transition manager 150 may know when all processors 120 have achieved their target frequencies. At that time, the transition manager 150 may notify all processors 120 that the SMP network 110 is now in a slow state. This notification may be interpreted as an instruction to begin sending empty packets in accordance with the slow state, as discussed below. In the slow state, the processors 120 may operate at clock speeds that were their target frequencies during the transitional state. During this slow state, the interconnect 130 may continue to operate at its initial frequency.

In the slow state, each processor 120 may insert empty packets as needed to account for the asynchronous nature of the processors 120 across the interconnect 130. Specifically, each processor 120 may send empty packets at a rate calculated not to overrun the slowest processor 120 in the slow state.

Because the frequencies of processors 120 may now be fixed and known in the slow state, the rate of empty packet insertions may be less than it was in the transitional state, as there may be less variability between the frequencies. For example, while the greatest potential rate differential for a processor 120 during the transitional state may be calculated as the initial frequency minus the lowest target frequency, the greatest potential rate differential for a processor 120 during the slow state may be calculated as the current frequency of the that processor 120 minus the lowest frequency across all processors 120. The current frequency of the processor 120 in question may be no larger than its initial frequency was in the normal state, because no processors 120 have sped up over the transitional state. Thus, the value of the greatest potential rate differential may be no higher than it was during the transitional state.

To move the computer system 400 from the slow state back to the normal state, the transition manager 150 may notify the processors 120 of the impending normal state. This notification may be interpreted as an instruction to transition to the normal state, and to send empty packets in accordance with the transitional state. In response to this notification, the processors may enter the transitional state, during which the processors 120 may increase their respective frequencies to a common target frequency.

Once again, during the transitional state, each processor 120 may send empty packets in accordance with the greatest potential rate differential among it and the other processors 120. For a first processor 120, the greatest potential rate differential may be the difference between the target frequency for all the processors 120 and the processor's frequency in the slow state, which was its target frequency when transitioning to the slow state. In this case, the target frequency when transitioning to normal state may be shared across all processors 120, because the impending normal state is a state in which all processors 120 run synchronously.

Each processor 120 may notify the transition manager 150 when it has reached the target frequency. When the transition manager 150 determines that all processors have reached the target frequency, the transition manager 150 may notify the processors 120 that the SMP network 110 is back in its normal state, at which all processors 120 are running at the same frequency. This notification may be interpreted by the processors 120 as an instruction to stop sending empty packets for the purpose of compensating for rate differentials. As needed, the transition manager 150 may initiate future transitions back and forth between the normal state, in which the processors 120 operate synchronously, and the slow state, in which the processors 120 operate asynchronously.

Figure 2:
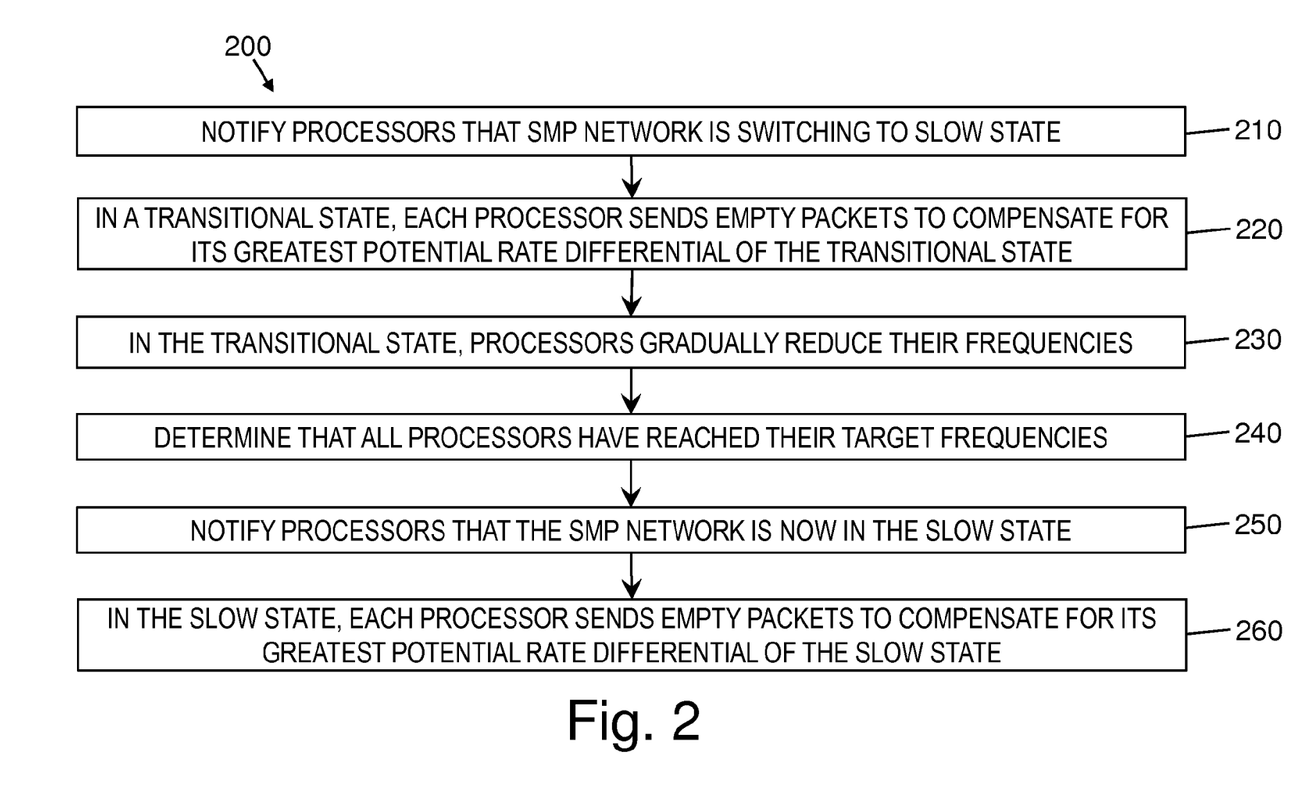
FIG. 2 is a flow diagram of a method for transitioning from synchronous to asynchronous operation, according to some embodiments of this disclosure.

FIG. 2 is a flow diagram of a method 200 for transitioning from synchronous to asynchronous operation, according to some embodiments of this disclosure. As shown in FIG. 2, at 210, the transition manager 150 may notify the processors 120 that the SMP network 110 is switching to a slow state. At block 220, in a transitional state responsive to the notification, each processor 120 may send empty packets to compensate for its greatest potential rate differential of the transitional state. At block 230, during the transitional state, the processors 120 may each gradually reduce their frequencies. At block 240, the transition manager 150 may determine that all processors 120 have reached their target frequencies. At block 250, the transition manager 150 may notify the processors 120 that the SMP network 110 is now in the slow state. At block 260, each processor 120 may send out empty packets to compensate for its greatest potential rate differential in the slow state.

Figure 3:
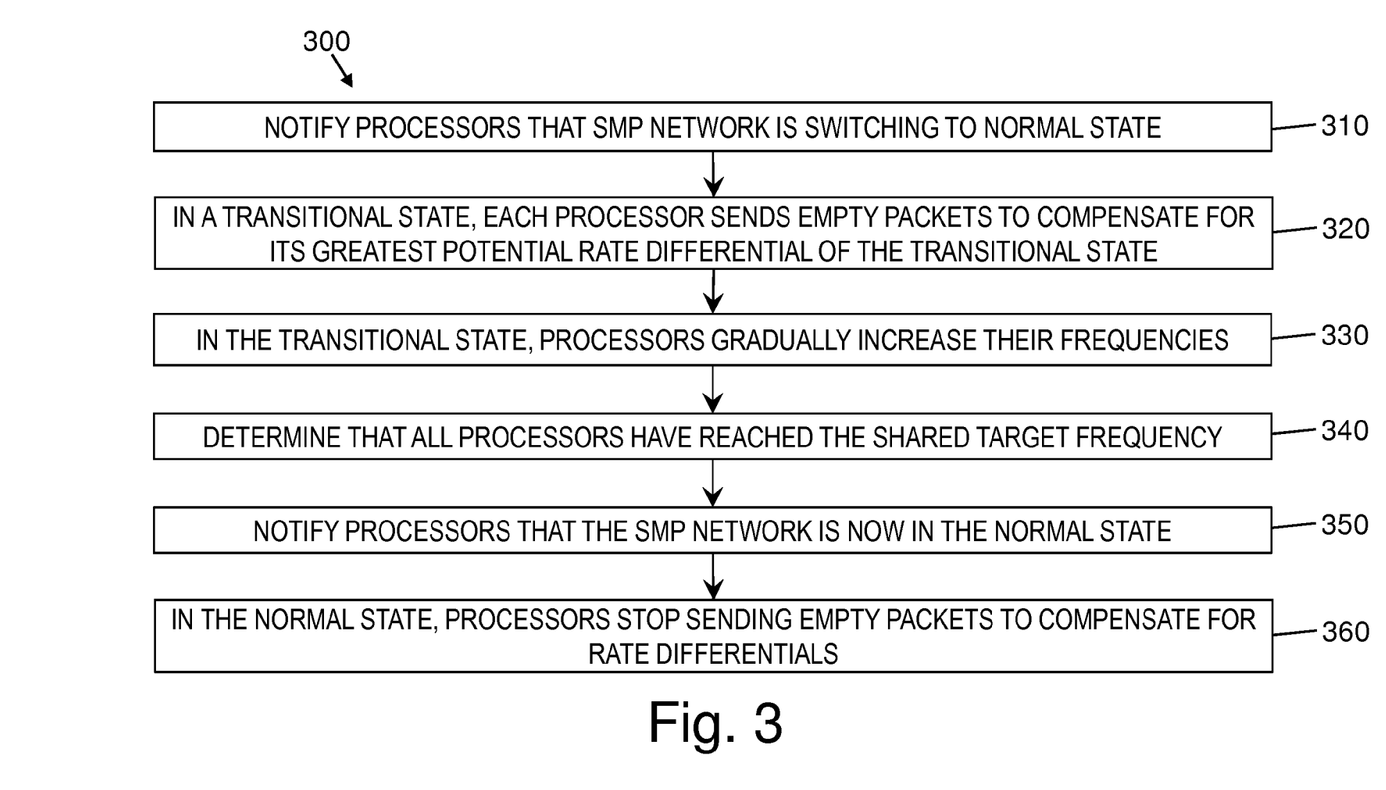
FIG. 3 is a flow diagram of a method for transitioning from asynchronous to synchronous operation, according to some embodiments of this disclosure.

FIG. 3 is a flow diagram of a method 300 for transitioning from asynchronous to synchronous operation, according to some embodiments of this disclosure. As shown in FIG. 3, at 310, the transition manager 150 may notify the processors 120 that the SMP network 110 is switching to a normal state. At block 320, while in a transitional state responsive to the notification, each processor 120 may send empty packets to compensate for its greatest potential rate differential of the transitional state. At block 330, in the transitional state, the processors 120 may each gradually increase their frequencies to a shared target frequency. At block 340, the transition manager 150 may determine that all processors 120 have reached the target frequency. At block 350, the transition manager 150 may notify the processors 120 that the SMP network 110 is now in the normal state. At block 360, in the normal state, the processors stop sending empty packets to compensate for rate differentials. In the normal state, the processors 120 need not send empty packets to compensate for rate differentials, because all processors 120 may operate at the same frequency as one another and as the interconnect 130.

FIG. 4 illustrates a block diagram of a computer system 400 for use in implementing a transition system or method according to some embodiments. The transition systems and methods described herein may be implemented in hardware, software (e.g., firmware), or a combination thereof. In some embodiments, the methods described may be implemented, at least in part, in hardware and may be part of the microprocessor of a special or general-purpose computer system 400, such as a personal computer, workstation, minicomputer, or mainframe computer.

In some embodiments, as shown in FIG. 4, the computer system 400 may include two or more processors 120, memory 410 coupled to a memory controller 415, and one or more input devices 445 and/or output devices 440, such as peripherals, that are communicatively coupled via a local I/O controller 435. These devices 440 and 445 may include, for example, a printer, a scanner, a microphone, and the like. Input devices such as a conventional keyboard 450 and mouse 455 may be coupled to the I/O controller 435. The I/O controller 435 may be, for example, one or more buses or other wired or wireless connections, as are known in the art. The I/O controller 435 may have additional elements, which are omitted for simplicity, such as controllers, buffers (caches), drivers, repeaters, and receivers, to enable communications.

The I/O devices 440, 445 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

Each processor 120 is a hardware device for executing hardware instructions or software, particularly those stored in memory 410. The processor 120 may be a custom made or commercially available processor, a central processing unit (CPU), an auxiliary processor among several processors associated with the computer system 400, a semiconductor based microprocessor (in the form of a microchip or chip set), a macroprocessor, or other device for executing instructions. The processor 120 includes a cache 125, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 470 may be organized as a hierarchy of more cache levels (L1, L2, etc.).

The memory 410 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 410 may incorporate electronic, magnetic, optical, or other types of storage media. Note that the memory 410 may have a distributed architecture, where various components are situated remote from one another but may be accessed by the processor 405.

The instructions in memory 410 may include one or more separate programs, each of which comprises an ordered listing of executable instructions for implementing logical functions. In the example of FIG. 4, the instructions in the memory 410 include a suitable operating system (OS) 411. The operating system 411 essentially may control the execution of other computer programs and provides scheduling, input-output control, file and data management, memory management, and communication control and related services.

Additional data, including, for example, instructions for the processor 405 or other retrievable information, may be stored in storage 420, which may be a storage device such as a hard disk drive or solid state drive. The stored instructions in memory 410 or in storage 420 may include those enabling the processor to execute one or more aspects of the transition systems and methods of this disclosure.

The computer system 400 may further include a display controller 425 coupled to a display 430. In some embodiments, the computer system 400 may further include a network interface 460 for coupling to a network 465. The network 465 may be an IP-based network for communication between the computer system 400 and an external server, client and the like via a broadband connection. The network 465 transmits and receives data between the computer system 400 and external systems. In some embodiments, the network 465 may be a managed IP network administered by a service provider. The network 465 may be implemented in a wireless fashion, e.g., using wireless protocols and technologies, such as WiFi, WiMax, etc. The network 465 may also be a packet-switched network such as a local area network, wide area network, metropolitan area network, the Internet, or other similar type of network environment. The network 465 may be a fixed wireless network, a wireless local area network (LAN), a wireless wide area network (WAN) a personal area network (PAN), a virtual private network (VPN), intranet or other suitable network system and may include equipment for receiving and transmitting signals.

Transition systems and methods according to this disclosure may be embodied, in whole or in part, in computer program products or in computer systems 400, such as that illustrated in FIG. 4.

Technical effects and benefits of some embodiments include a high-performance mechanism for asynchronous operation and transitions between synchronous and asynchronous operations in an SMP network 110. According to some embodiments, the use of empty packets may enable the various processors 120 of the SMP network 110 to save power by operating at slow clock speeds, while at the same time, no processors 120 overrun other processors 120.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   instructing two or more processors that are operating in a normal state of a symmetric multiprocessing (SMP) network to transition from the normal state to a slow state, wherein the two or more processors reduce their frequencies to respective target frequencies in a transitional state when transitioning from the normal state to the slow state;
   determining that the two or more processors have achieved their respective target frequencies for the slow state;
   entering the slow state, responsive to the determining;
   calculating a first greatest potential rate differential between a first processor of the two or more processors and a remainder of the two or more processors during the slow state, wherein the calculating comprises:
      identifying a second processor of the two or more processors, wherein the second processor has a lowest frequency from among the two or more processors during the slow state; and
      determining, as the first greatest potential rate differential, a rate differential between the first processor and the second processor; and
   responsive to the entering the slow state, instructing the first processor to send empty packets across an interconnect to compensate for the first greatest potential rate differential between the first processor and the remainder of the two or more processors during the slow state, wherein a percentage of empty packets sent as compared to total packets sent by the first processor is based on the first greatest potential rate differential.

2. The method of claim 1, further comprising, responsive to entering the transitional state, instructing the first processor to send empty packets across the interconnect, while the two or more processors reduce their frequencies to respective target frequencies, to compensate for a second greatest potential rate differential between the first processor and the remainder of the two or more processors during the transitional state.

3. The method of claim 2, further comprising:
   calculating, for the first processor, the second greatest potential rate differential applicable during the transitional state, wherein each of the two or more processors has a respective initial frequency in the normal state and a respective target frequency for the slow state, and wherein the calculating comprises:
      identifying a third processor of the two or more processors, wherein the third processor has a lowest respective target frequency from among the two or more processors;

determining, as the second greatest potential rate differential, a rate differential between the respective initial frequency of the first processor and the respective target frequency of the third processor.

4. The method of claim 2, wherein the first greatest potential rate differential differs from the second greatest potential rate differential.

5. The method of claim 1, further comprising:
instructing the two or more processors to transition from the slow state to the normal state, wherein the two or more processors increase their frequencies to a shared target frequency in the transitional state when transitioning from the slow state to the normal state;
determining the two or more processors have achieved the shared target frequency for the normal state; and
responsive to having returned to the normal state, instructing the first processor to stop sending empty packets across the interconnect to compensate for a greatest potential rate differential between the first processor and a remainder of the two or more processors.

6. A system comprising:
a memory having computer readable instructions; and
one or more processing devices for executing the computer readable instructions, the computer readable instructions comprising:
instructing two or more processors that are operating in a normal state of a symmetric multiprocessing (SMP) network to transition from the normal state to a slow state, wherein the two or more processors reduce their frequencies to respective target frequencies in a transitional state when transitioning from the normal state to the slow state;
determining that the two or more processors have achieved their respective target frequencies for the slow state;
entering the slow state, responsive to the determining;
calculating a first greatest potential rate differential between a first processor of the two or more processors and a remainder of the two or more processors during the slow state, wherein the calculating comprises:
identifying a second processor of the two or more processors, wherein the second processor has a lowest frequency from among the two or more processors during the slow state; and
determining, as the first greatest potential rate differential, a rate differential between the first processor and the second processor; and
responsive to the entering the slow state, instructing the first processor to send empty packets across an interconnect to compensate for the first greatest potential rate differential between the first processor and the remainder of the two or more processors during the slow state, wherein a percentage of empty packets sent as compared to total packets sent by the first processor is based on the first greatest potential rate differential.

7. The system of claim 6, the computer readable instructions further comprising, responsive to entering the transitional state, instructing the first processor to send empty packets across the interconnect, while the two or more processors reduce their frequencies to respective target frequencies, to compensate for a second greatest potential rate differential between the first processor and the remainder of the two or more processors during the transitional state.

8. The system of claim 7, the computer readable instructions further comprising:
calculating, for the first processor, the second greatest potential rate differential applicable during the transitional state, wherein each of the two or more processors has a respective initial frequency in the normal state and a respective target frequency for the slow state, and wherein the calculating comprises:
identifying a third processor of the two or more processors, wherein the third processor has a lowest respective target frequency from among the two or more processors;
determining, as the second greatest potential rate differential, a rate differential between the respective initial frequency of the first processor and the respective target frequency of the third processor.

9. The system of claim 7, wherein the first greatest potential rate differential differs from the second greatest potential rate differential.

10. The system of claim 6, the computer readable instructions further comprising:
instructing the two or more processors to transition from the slow state to the normal state, wherein the two or more processors increase their frequencies to a shared target frequency in the transitional state when transitioning from the slow state to the normal state;
determining the two or more processors have achieved the shared target frequency for the normal state; and
responsive to having returned to the normal state, instructing the first processor to stop sending empty packets across the interconnect to compensate for a greatest potential rate differential between the first processor and a remainder of the two or more processors.

11. A computer program product for transitioning between a synchronous mode of operation and an asynchronous mode of operation, the computer program product comprising a computer readable storage medium having program instructions embodied therewith, the program instructions executable by a processing device to cause the processing device to perform a method comprising:
instructing two or more processors that are operating in a normal state of a symmetric multiprocessing (SMP) network to transition from the normal state to a slow state, wherein the two or more processors reduce their frequencies to respective target frequencies in a transitional state when transitioning from the normal state to the slow state; and
determining that the two or more processors have achieved their respective target frequencies for the slow state;
entering the slow state, responsive to the determining;
calculating a first greatest potential rate differential between a first processor of the two or more processors and a remainder of the two or more processors during the slow state, wherein the calculating comprises:
identifying a second processor of the two or more processors, wherein the second processor has a lowest frequency from among the two or more processors during the slow state; and
determining, as the first greatest potential rate differential, a rate differential between the first processor and the second processor; and
responsive to the entering the slow state, instructing the first processor to send empty packets across an interconnect to compensate for the first greatest potential rate differential between the first processor and the remainder of the two or more processors during the slow state, wherein a percentage of empty packets sent as compared to total packets sent by the first processor is based on the first greatest potential rate differential.

12. The computer program product of claim 11, wherein the method further comprising, responsive to entering the transitional state, instructing the first processor to send empty packets across the interconnect, while the two or more processors reduce their frequencies to respective target frequencies, to compensate for a second greatest potential rate differential between the first processor and the remainder of the two or more processors during the transitional state.

13. The computer program product of claim 12, wherein the method further comprising:
calculating, for the first processor, the second greatest potential rate differential applicable during the transitional state, wherein each of the two or more processors has a respective initial frequency in the normal state and a respective target frequency for the slow state, and wherein the calculating comprises:
identifying a third processor of the two or more processors, wherein the third processor has a lowest respective target frequency from among the two or more processors;
determining, as the second greatest potential rate differential, a rate differential between the respective initial frequency of the first processor and the respective target frequency of the third processor.

14. The computer program product of claim 12, wherein the first greatest potential rate differential differs from the second greatest potential rate differential.

15. The computer program product of claim 11, wherein the method further comprising:
instructing the two or more processors to transition from the slow state to the normal state, wherein the two or more processors increase their frequencies to a shared target frequency in the transitional state when transitioning from the slow state to the normal state;
determining the two or more processors have achieved the shared target frequency for the normal state; and
responsive to having returned to the normal state, instructing the first processor to stop sending empty packets across the interconnect to compensate for a greatest potential rate differential between the first processor and a remainder of the two or more processors.

* * * * *